March 8, 1949.                    C. F. HASSELWANDER                    2,464,036
                                        FILTER
Filed Oct. 16, 1943                                             2 Sheets-Sheet 1

INVENTOR.
CLAUDE F. HASSELWANDER
BY
ATTORNEY.

Patented Mar. 8, 1949

2,464,036

UNITED STATES PATENT OFFICE 2,464,036

FILTER

Claude F. Hasselwander, Rochester, N. Y., assignor to Dollinger Corporation, a corporation of New York Application October 16, 1943, Serial No. 506,602

2 Claims. (Cl. 210—169)

This invention relates to filters.

In filters of the radial fin type, it is desirable to have a filter element which can be readily replaced without need of sending the entire filter unit back to the factory for renewal.

The main feature of the present invention, therefore, relates to a novel construction of filter unit in which an inexpensive replaceable filter element is provided so that a fresh filter element can be easily substituted for an element that has become fouled in use.

Another feature of the invention relates to a novel arrangement for sealing the ends of the pockets or fins formed in a radial fin filter element, without the need of actually stapling or sewing the ends of these pockets to close them.

Other features and advantages of the invention will appear from the detailed description and claims when taken with the drawings in which:

Figure 1:
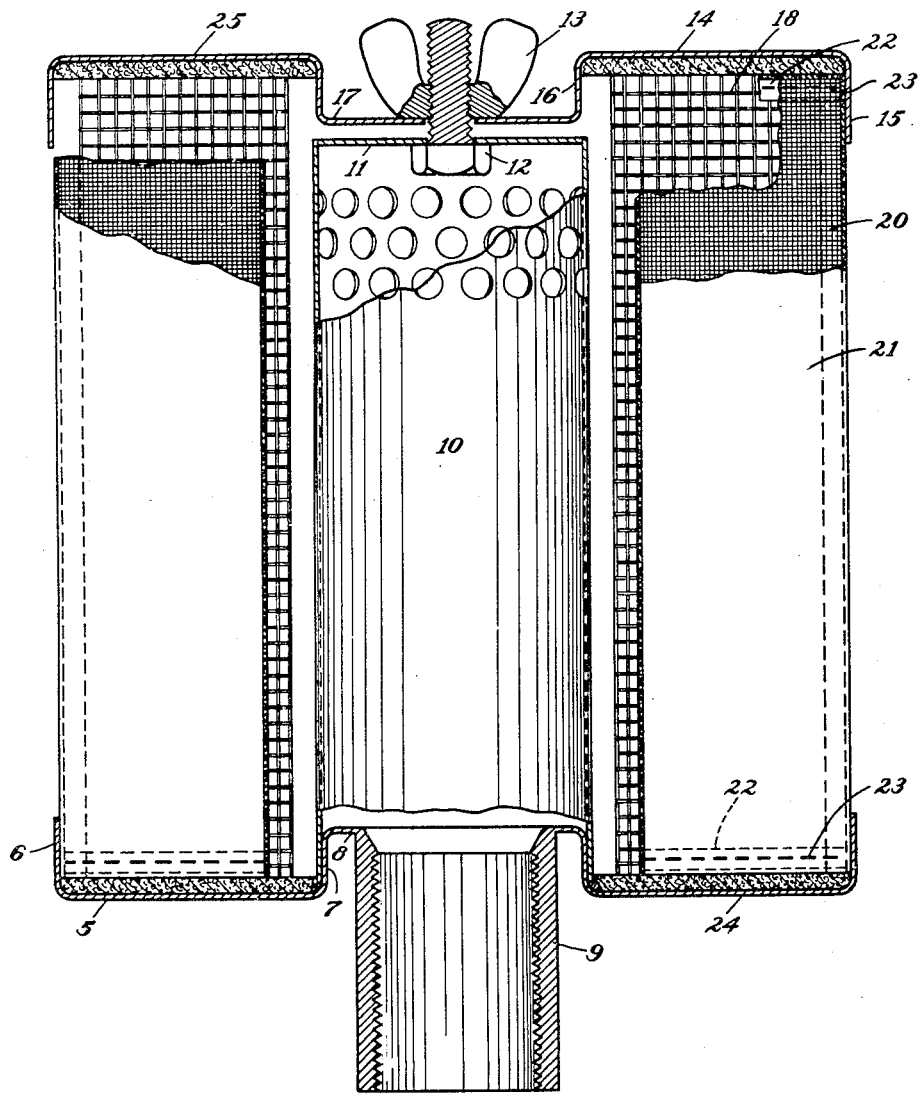
Fig. 1 is a fragmentary vertical section of a filter unit of the present invention.
Figure 2:
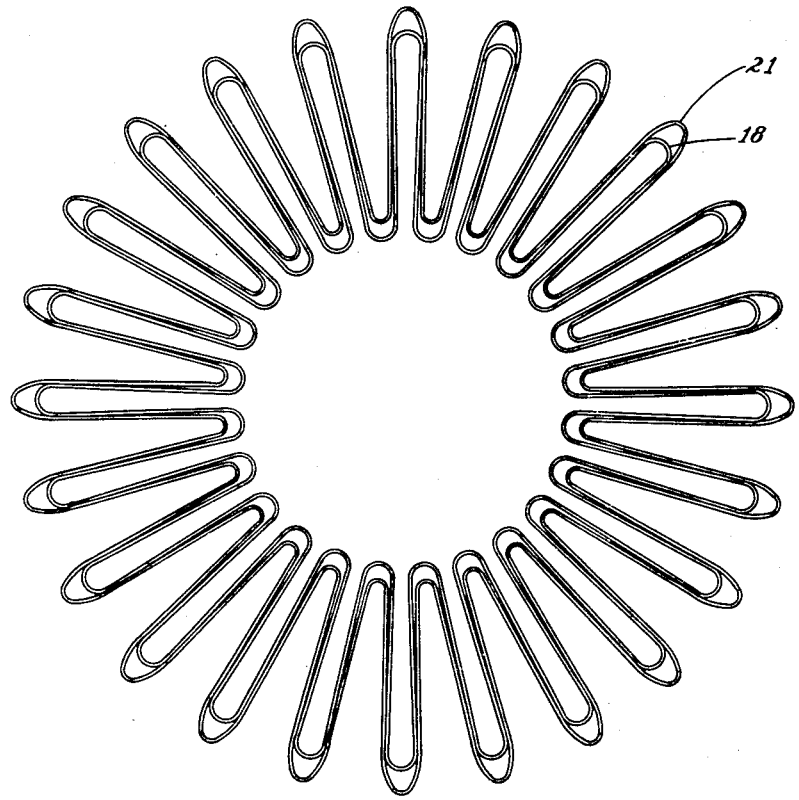
Fig. 2 is a plan view of a radial fin support with a replaceable filter element telescoped thereon for use in the filter unit of Fig. 1.

Referring especially to Figs. 1 and 2, the numeral 5 designates an annular bottom plate having its outer edge formed as a vertical flange 6 and having its inner edge provided with an upwardly extending flange 7, the out turned edge 8 of the flange 7 being spot-welded or otherwise sealed to the upper end of an outlet sleeve 9. This sleeve may be internally threaded for connection to a discharge pipe. The annular flange 7 of the bottom plate is adapted to have telescoped thereon a hollow, cylindrical core 10 of perforated sheet metal. The lower edge of this core is preferably welded or otherwise sealed to the annual flange 7, while upper end 11 of the core is closed except for a central aperture therethrough. A bolt 12 extending through said central aperture and having its head secured to the inner surface of the top 11, has a butterfly nut 13 threaded thereon. This bolt and nut serve to retain a top plate 14 in position on the filter unit, the top plate preferably having the same diameter as the bottom plate 5. The top plate has a downwardly projecting peripheral flange 15 and is provided with a depressed central part comprising the annular flange 16 joined to a flat circular portion 17 which has a diameter approximately equal to the diameter of the cylindrical core 10. The recessed top plate 14 and the bottom plate 5 are adapted to retain a hollow radial fin support 18 in concentric relation on core 10. The radial fin support 18, which is fluted in cross section, and which is made of relatively coarse heavy screen material, has snugly fitted thereover, a replaceable filter element of similar fluted cross section. The replaceable filter element comprises a reinforcing layer 20 of screening which is preferably of finer mesh than that of the support and which can be made either of metal or plastic material. The surface of the reinforcing layer is covered with a filtering layer 21, which may be fabric or felt-like material. This fabric covers the outer surface of the layer of fine screening 20 and extends over the edge to the inner surface thereof at each end where a hem 22 is turned and stitched, as indicated at 23, to the respective margins of the screening layer 20. It will be understood that the filter element comprising the fine screening layer 20 and the covering fabric 21, is made of relatively inexpensive material so that when the filter element becomes fouled in service, it can be discarded and a new element substituted therefore. It should be pointed out that in the present arrangement, it is unnecessary to stitch the ends of the radial pockets or fins of the filter element as in prior devices since these pockets are sealed at their lower ends by an annular layer or washer 24 of felt material and are likewise closed at their upper ends by a similar layer or washer 25 of felt material.

When it becomes necessary to replace a filter element, the butterfly nut 13 is unscrewed from the bolt 12. This permits the cover plate 14 and the felt washer 24 to be disassembled from the core 10. The support 18 with the filter element thereon is withdrawn from the core 10. The used lower felt washer 24 is removed from the bottom and a fresh felt washer is replaced thereon. The fouled filter element comprising the fabric layer 21 and its reinforcing screen 20 is removed endwise from coarse screen support 18. A fresh filter element is then replaced on the outside of the support. The support 18 with a fresh filter element thereon is replaced on the core 10 with the lower margin of the several flutes embraced by the flange 6 of the bottom plate 5. It will be understood that the lower ends of the several flutes engage the fresh felt washer 24 which rests against the bottom plate 5. A fresh felt washer 25 is placed within the cover plate 14. This cover plate with its fresh washer is then assembled on the filter element together with the support 18, in the position shown in Fig. 1. Thereafter the butterfly nut 13 is tightened on the bolt 12 to force the cover plate 14 toward the bottom plate 5. This operation embeds the top and bottom edges of the filter element in the felt washers 24 and 25 to prevent leakage of unfiltered fluid through the filter unit. Thus, the fluid to be filtered must pass inward through the filter element where it is freed of foreign matter, and then flows through the openings in the cylindrical core 10 to be discharged through the sleeve 9.

Figure 3:
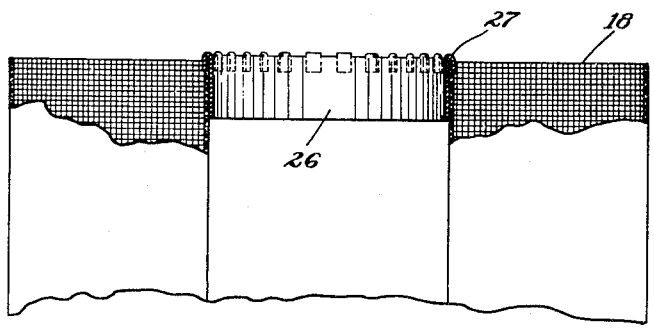
Fig. 3 discloses a modified form of the invention wherein retaining rings respectively engage the upper and lower edges of the inner flutes of a radial fin support, a construction which is desirable in filter units of larger sizes.

In the modified form of the invention, shown in Fig. 3 the fluted support 18 of coarse screen material has the inner ends of its flutes maintained in circular relation by rings 26, one ring engaging the bottom margin (not shown) of the support. Each ring 26 is provided with a series of fingers 27 one of which is adapted to enter each flute, the fingers being then bent inward to grip the several flutes against the outer surface of the ring. The construction illustrated in Fig. 3 insures a support of greater rigidity and is therefore particularly suited for use in larger sizes of filter units.

Although preferred embodiments of the present invention have been disclosed, it will be understood that other modifications may be made within the spirit and scope of the appended claims.

What I claim is:

1. A filter unit comprising a circular bottom plate provided with an outlet, a circular top plate spaced from said bottom plate, each of said plates being lined with a fibrous sheet, a generally cylindrical radial fin support made of coarse rigid porous material and mounted with its ends respectively engaging said sheets, said support being formed with flutes and being provided at its top and also at its bottom with a reinforcing ring, each ring having fingers gripping the respective flutes to afford a rigid structure, a radial fin filter element generally coextensive with said support and telescoped thereover to engage the outside surface of said support, said element being open at both of its ends and being formed of an outer layer of fibrous material through which cold oil and the like will pass and being also formed of an inner layer of finer screen material, and means for drawing said plates toward each other to engage the respective ends of said filter element.

2. A filter unit comprising a circular bottom plate provided with an outlet, a circular top plate spaced from said bottom plate, each of said plates being lined with a fibrous sheet, a generally cylindrical radial fin support made of coarse rigid porous material and mounted with its ends respectively engaging said sheets, a continuous radial fin filter element generally coextensive with said support and slidable longitudinally thereover to engage the outside surface of said support, said element being open at both of its ends and being formed of one layer of unimpregnated fibrous material and being also formed of a second layer of screen material readily conformable to said support, and means for drawing said plates toward each other whereby said sheets engage the respective ends of said filter element.

CLAUDE F. HASSELWANDER.

REFERENCES CITED

The following references are of record in the file of this patent:

UNITED STATES PATENTS

| Number | Name | Date |
|---|---|---|
| 231,066 | Long | Aug. 10, 1880 |
| 1,362,522 | Biette | Dec. 14, 1920 |
| 1,502,545 | Bowes | July 22, 1924 |
| 1,728,305 | Raney | Sept. 17, 1929 |
| 1,898,027 | Winslow | Feb. 21, 1933 |
| 1,898,259 | Orem | Feb. 21, 1933 |
| 1,983,100 | Schulz | Dec. 4, 1934 |
| 2,016,993 | Dollinger | Oct. 8, 1935 |
| 2,050,581 | Orem | Aug. 11, 1936 |
| 2,068,511 | Raisch | Jan. 19, 1937 |
| 2,145,535 | Vokes | Jan. 31, 1939 |
| 2,218,800 | Williams | Oct. 22, 1940 |
| 2,239,868 | Williams | Apr. 29, 1941 |
| 2,239,950 | Berg | Apr. 29, 1941 |
| 2,279,423 | Vokes | Apr. 14, 1942 |
| 2,287,344 | Easton et al. | June 23, 1942 |